May 7, 1940.  M. R. HUTCHISON, JR  2,199,998
CAMERA SHUTTER
Filed Oct. 26, 1938     2 Sheets-Sheet 1

Miller R. Hutchison Jr.
INVENTOR

BY
ATTORNEYS

May 7, 1940.  M. R. HUTCHISON, JR  2,199,998
CAMERA SHUTTER
Filed Oct. 26, 1938     2 Sheets-Sheet 2

Miller R. Hutchison Jr.
INVENTOR
BY
ATTORNEYS

Patented May 7, 1940

2,199,998

UNITED STATES PATENT OFFICE 2,199,998

CAMERA SHUTTER

Miller R. Hutchison, Jr., Rochester, N. Y., assignor to Eastman Kodak Company, Rochester, N. Y., a corporation of New Jersey Application October 26, 1938, Serial No. 237,017

7 Claims. (Cl. 95—60)

This invention relates to photography and particularly to shutters for cameras. One object of my invention is to provide a camera shutter which is inexpensive to manufacture, which will give a desirable relatively slow instantaneous exposure and which is provided with a trigger, the handle of which moves only in one direction in making an exposure. Another object of my invention is to provide a shutter in which the shutter blade is so pivoted that opposite parts of the blade are successively moved across an exposure aperture and in which the blade is pivoted on an oscillatable member which in turn is moved by a shutter trigger member. A still further object of my invention is to provide a shutter in which the shutter blade is moved by hypocyclic gearing.

Coming now to the drawings, wherein like reference characters denote like parts throughout.

It has been difficult to construct inexpensive camera shutters of a few simple parts and to provide for a comparatively slow exposure. It has been found that where single lenses or other lenses of small aperture are used, it is desirable to give an exposure of approximately $\frac{1}{25}$ of a second where only a single exposure is provided for and that it is difficult to obtain such an exposure without retarding mechanism which usually adds to the cost of the shutter.

In order to overcome this difficulty, I have provided a shutter in which the shutter blade is moved through hypocycloidal gearing which is of such nature that it can be inexpensively punched out of sheet material and which at the same time produces a satisfactory slow exposure without increasing the difficulty of operating the shutter due to relatively heavy springs.

Figure 1:
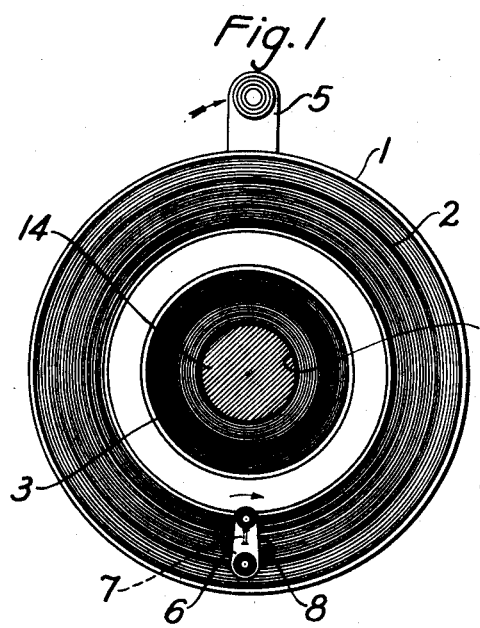
Fig. 1 shows a front elevation of a shutter constructed in accordance with and embodying a preferred form of my invention.

Fig. 1 indicates a typical shutter exterior in which the shutter may consist of a casing designated broadly as 1 with a shutter cover 2 supporting an annular member 3 in which there is a central exposure aperture 4. A trigger 5 is mounted on the top of the camera and is to be moved in the direction shown by the arrow to make an exposure. There is a time lever 6 on the lower part of the shutter and when it is moved to cover the letter I shown in dotted lines at 7, the shutter is ready to make an instantaneous exposure. When the lever is moved in the direction shown by the arrow to cover the indicating mark B, shown at 8, the shutter parts are positioned for bulb exposure.

The shutter casing 1 preferably includes an upstanding flange 10 into which the shutter parts may be placed, this flange including a slot 11 through which the shutter trigger 5 may pass.

Figure 7:
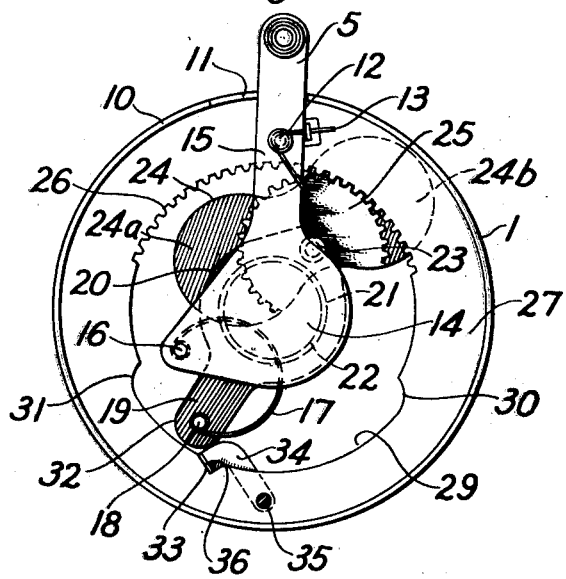
Fig. 7 is a similar view but with the shutter parts returned to their normal position of rest so that the shutter is again ready for a second exposure.

The trigger 5 is pivoted upon a stud 12 and a spring 13 tends to move the trigger in the direction shown by the arrow into a position in which an edge of the trigger rests on an edge of the slot 11 as indicated in Fig. 7.

Figure 6:
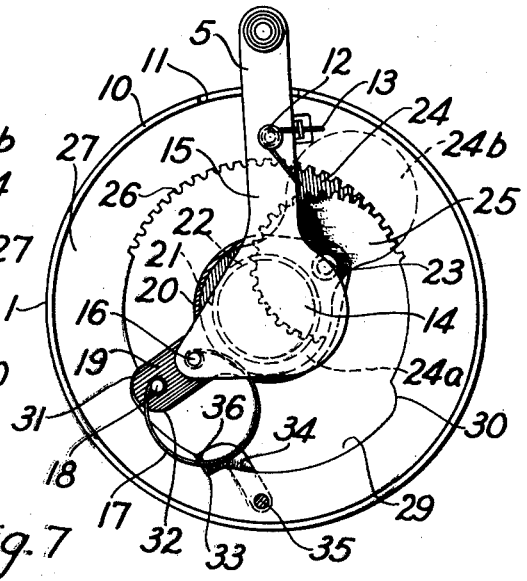
Fig. 6 is a view showing the parts in the position which they assume as the trigger is being released.

The trigger 5 includes a cover blind 14 which is adapted to cover the exposure aperture 4 when the parts are in their normal position of rest as illustrated in Fig. 7 and when the parts are returning to this position as indicated in Fig. 6.

Figure 3:
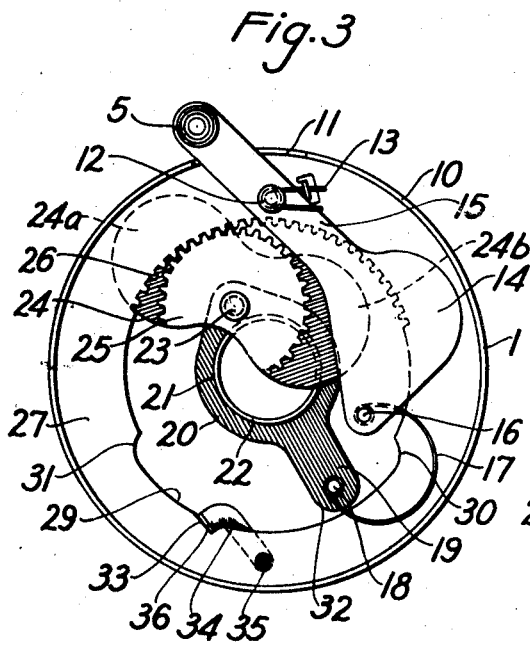
Fig. 3 is a similar view showing the shutter blade approximately half open.
Figure 4:
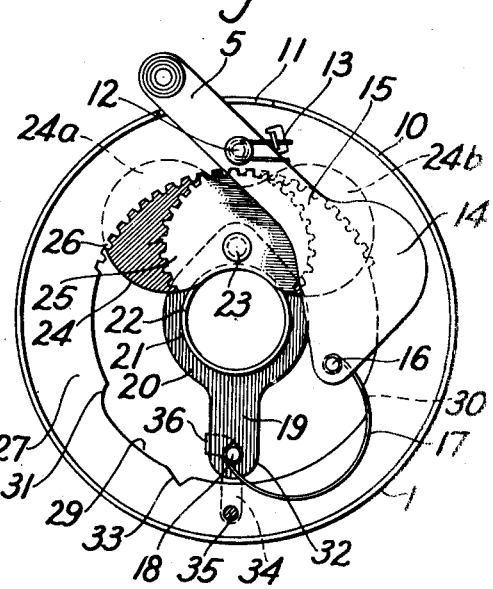
Fig. 4 is a similar view with the shutter blade in a wide open position in which position the blade may be held by a bulb lever.

The trigger 5 includes an arm 15 offset from the cover blind and carrying a stud 16 supporting one end of a "hairpin" spring 17, the other end of which is attached to a stud 18 carried by an arm 19 projecting outwardly from an oscillatable member 20 which, as best shown in Figs. 3 and 4, has a central aperture 21 closely engaged and free to move on the upstanding flange 22 of the shutter casing 10.

Figure 2:
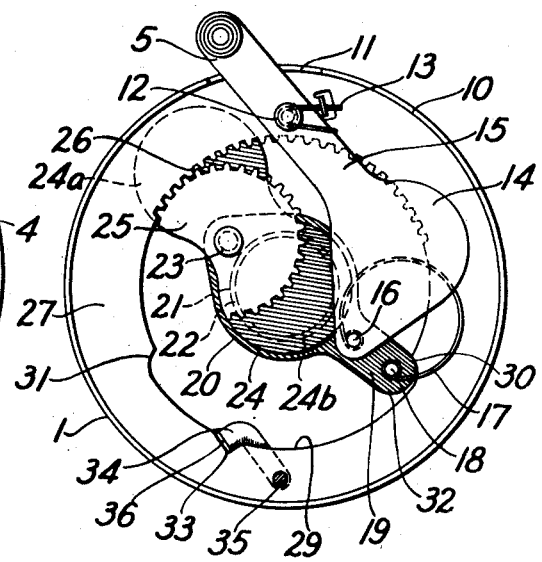
Fig. 2 is a plan view of the shutter shown in Fig. 1 but with the shutter cover removed, showing the shutter parts in a position in which an exposure is about to be made.

The oscillatable member 20 includes a stud 23 which supports the shutter blade 24 and a gear segment 25 fixedly attached to the shutter blade as by spot welding. Gear segment 25 is adapted to mesh with a gear segment 26 which is carried by an annular member 27. Thus, when the oscillatable member 20 is moved by the spring 17 through actuation of the trigger 5, as soon as the studs 16 and 18 pass a dead center as indicated in Fig. 2, the tension of the spring will rapidly oscillate the oscillatable member 20 as shown in Figs. 3 and 4 and will swing the shutter stud 23, causing gear 25 to roll in gear 26 so that the shutter blade may turn upon the pivot 23 as this pivot is turned in a clockwise direction, causing the symmetrical ends 24—a and 24—b of the shutter blade to open and close the exposure aperture 4.

Figure 5:
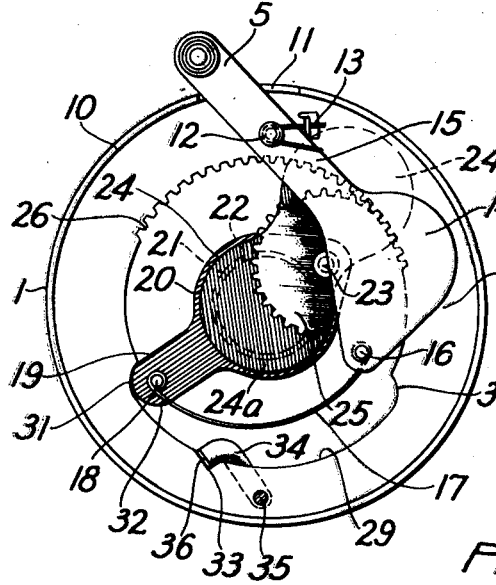
Fig. 5 is a similar view but with the parts in the position they assume after an exposure has been completed and before the trigger has been released.

This movement occurs by tensioning the "hairpin" spring 17 through movement of the shutter trigger 5 in a counterclockwise position from the position shown in Figs. 1 and 7 to the position shown in Fig. 5.

In order to limit the movement of the oscillatable member, the annular member 27 is provided with a cut-out 29 having shoulders 30 and 31, against which the rounded end 32 of the arm 19 is adapted to come to rest. The arm 19 engages the shoulder 30 when the parts are in position to start an exposure as indicated in Fig. 2 and the arm 19 engages the shoulder 31 at the completion of an exposure as indicated in Fig. 5.

The recess portion 29 is preferably notched as indicated at 33 for the reception of the time stop lever 34 pivoted upon the shaft 35 and operable by the time lever 6 as above described. Thus, this lever may move from the position lying in the notch 33, indicated in Fig. 3, in which position it permits the arm 19 to swing freely through its path to its operative position shown in Fig. 4, in which the upstanding flange 36 will engage the oscillatable member 20 through its arm 19 when the shutter blade 24 has completely uncovered the exposure aperture 4. Bulb lever has sufficient friction with the shutter to remain in its operative position until manually moved therefrom.

Thus when the lever 6 is set for time exposure upon the actuation of the trigger 5 the oscillatable member will be moved to the position shown in Fig. 4 and after the required time has elapsed the aperture 4 may be closed in either one of two ways. First, by releasing the trigger 5 the cover blind 14 will cover the aperture and the shutter blade will return to its normal position. Or, second, by merely moving the time lever 6 to its instantaneous position, the lug 36 will be moved into the notch 33 so that the spring 17 will cause the oscillatable member to move until arm 19 strikes shoulder 31, thus causing the shutter lever to complete its movement to close the exposure aperture.

With a shutter of the type described, it is only necessary to move the shutter trigger 5 in one direction to make an exposure, because after the shutter blade has been moved through the action of the spring 17 to complete an exposure as indicated in Fig. 5, a release of the trigger will permit the spring 17 to return the trigger to its initial position indicated in Fig. 7. As will be seen from Fig. 6, the return movement of the trigger turns the spring 17 and after the cover blind 14 lies over the exposure aperture 4 the studs 16 and 18 pass a dead center, causing the oscillatable member to swing so that arm 19 leaves shoulder 31 and moves until it strikes shoulder 30, thus returning the shutter parts to their initial position.

A shutter described as above utilizing hypocycloidal gearing is of especial advantage because I have found that such gearing offers sufficient resistance to the shutter blade to prevent the blade from making too rapid a movement under the impulse of a light spring. It is, of course, always desirable to use as light a spring as can be used without sacrificing efficiency because it requires less pressure on the shutter trigger.

Although I have described my invention in some detail, it is to be understood that the invention may be carried out in a number of ways. Hence, it is not to be restricted, excepting insofar as is necessitated by the prior art and the spirit of the appended claims.

I claim:

1. In a shutter for photographic cameras, the combination with an apertured casing, of a shutter blade adapted to cover and uncover the aperture, an oscillatable member mounted on the casing, means to oscillate the member on its mount, a pivotal mount carried by the oscillatable member and rotatably supporting thereon said shutter blade and a gear fixedly carried thereby, a gear carried by the shutter meshing with the shutter blade gear, whereby oscillation of the oscillatable member may swing the shutter through engagement of the shutter gear and blade gears, a trigger, and a spring connecting the trigger and oscillatable member for operating the latter from the former when the trigger is moved.

2. In a shutter for photographic cameras, the combination with an apertured casing, of a shutter blade for opening and closing the aperture, a trigger for actuating the shutter, connections between the trigger and shutter blade including hypocyclic gearing for imparting compound rotation of said blade to make an exposure, and a spring included in the connections between the trigger and shutter blade adapted to be tensioned and released through movement of the trigger for imparting movement to the shutter blade.

3. In a photographic camera shutter, the combination with an apertured casing, of an oscillatable member mounted therein, and carrying an oscillatable stud, a shutter blade pivoted on the stud and comprising a pair of spaced similar leaves, each adapted to cover the exposure aperture according to the position of the shutter blade, cooperating parts on the blade and shutter for moving the former by the latter when said blade pivot is moved by the oscillatable member, a spring attached to the oscillatable member, and a trigger carrying the other end of said spring whereby manual operation of the trigger may turn the shutter blade through the action of the spring to make an exposure.

4. In a photographic camera shutter, the combination with an apertured casing, including an annular flange extending around the aperture, of an oscillatable member mounted therein, and journaled upon the annular flange, and carrying an oscillatable stud, a shutter blade pivoted on the stud and comprising a pair of spaced similar leaves, each adapted to cover the exposure aperture according to the position of the shutter blade, cooperating parts on the blade and shutter, for moving the former by the latter when said blade pivot is moved by the oscillatable member, a spring attached to the oscillatable member, and a trigger carrying the other end of said spring whereby manual operation of the trigger may turn the shutter blade through the action of the spring to make an exposure.

5. In a photographic camera shutter the combination with an apertured casing, of an oscillatable member mounted therein, and carrying an oscillatable stud, a shutter blade pivoted on the stud and comprising a pair of spaced similar leaves, each adapted to cover the exposure aperture according to the position of the shutter blade, cooperating parts on the blade and shutter comprising intermeshing gear teeth for moving the former by the latter when said blade pivot is moved by the oscillatable member, a spring attached to the oscillatable member, and a trigger carrying the other end of said spring whereby manual operation of the trigger may turn the shutter blade through the action of the spring to make an exposure.

6. In a shutter for photographic cameras, the combination with an annular apertured shutter casing, of a shutter blade including symmetrical leaf portions, a pivotal support for the shutter blade arranged off-center with respect to the shutter blade, an oscillatable member mounted to turn axially of the shutter, said pivotal support being carried by said oscillatable member to move about the axis of the shutter, gear teeth carried by the shutter blade, and gear teeth carried by the shutter and meshing therewith, a trigger for the shutter, and spring connections between the trigger and oscillatable member for rapidly moving the latter from the former, said meshing gear teeth operating the shutter blade as the pivotal support is oscillated to drive the blade whereby one symmetrical leaf after the other may be swung over the exposure aperture to make an exposure.

7. In a shutter for photographic cameras, the combination with an annular apertured shutter casing, of a shutter blade including symmetrical leaf portions, a pivotal support for the shutter blade arranged off-center with respect to the shutter blade, and near an edge thereof, an oscillatable member mounted to turn axially of the shutter, said pivotal support being carried by said oscillatable member to move about the axis of the shutter, gear teeth carried by the shutter blade, and gear teeth carried by the shutter and meshing therewith, a trigger for the shutter, and spring connections between the trigger and oscillatable member for rapidly moving the latter from the former, said meshing gear teeth operating the shutter blade as the pivotal support is oscillated to drive the blade, whereby one symmetrical leaf after the other may be swung over the exposure aperture to make an exposure, the pivotal support of the blade near an edge thereof, causing said blade to be entirely to one side of the exposure aperture while an exposure is being made.

MILLER R. HUTCHISON, Jr.